United States Patent [19]

Osinski et al.

[11] 4,256,679

[45] Mar. 17, 1981

[54] PROCESS AND DEVICE FOR FILLING CAVITIES, PARTICULARLY MOLD CAVITIES, WITH A REACTIVE, FLOWABLE MIXTURE

[75] Inventors: Ulrich Osinski, Koenigswinter; René Kummer, Bornheim-Kardorf, both of Fed. Rep. of Germany

[73] Assignee: Maschinenfabrik Hennecke GmbH, Leverkusen, Fed. Rep. of Germany

[21] Appl. No.: 52,876

[22] Filed: Jun. 28, 1979

[30] Foreign Application Priority Data

Jul. 1, 1978 [DE] Fed. Rep. of Germany ....... 2829016

[51] Int. Cl.³ .............................................. B29D 27/00
[52] U.S. Cl. .................................... 264/51; 264/328.2; 264/DIG. 83; 425/543; 425/817 R; 521/917
[58] Field of Search ............... 264/54, DIG. 83, 51, 264/328.2; 422/133; 425/817 R, 543; 521/917

[56] References Cited

U.S. PATENT DOCUMENTS

| 2,990,252 | 6/1961 | Geldern et al. ............... 422/133 X |
| 3,122,785 | 3/1964 | Weinbrenner et al. ........... 264/54 X |
| 3,220,801 | 11/1965 | Rill et al. .................... 422/133 |
| 3,222,134 | 12/1965 | Peterson ....................... 422/133 |
| 3,264,067 | 8/1966 | Alderfer ...................... 264/54 X |
| 3,451,786 | 6/1969 | Perrin ........................ 521/917 X |
| 3,617,029 | 11/1971 | Breer et al. ................... 422/133 |
| 3,982,870 | 9/1976 | Boden et al. ................ 264/DIG. 83 |
| 3,991,147 | 11/1976 | Knipp et al. ................ 264/DIG. 83 |

FOREIGN PATENT DOCUMENTS 2737616 1/1979 Fed. Rep. of Germany ... 264/DIG. 83

*Primary Examiner*—Philip Anderson
*Attorney, Agent, or Firm*—Gene Harsh; Joseph C. Gil; R. Brent Olson

[57] ABSTRACT

The instant invention broadly relates to a process and apparatus for filling a cavity with a reactive mixture. More particularly, the invention relates to a process for filling cavities, particularly mold cavities, with a reactive, flowable mixture which preferably forms foam, wherein at least two reaction components are brought into a mixing zone, where they are mixed and then brought into the cavity, the improvement wherein at the beginning of the filling process, during a limited time interval, the reaction mixture is fed into the cavity under low flow velocity until the mixture has reached a certain level in the cavity, and subsequently the remaining mixture to be injected, is fed in under increased flow velocity.

15 Claims, 3 Drawing Figures

PROCESS AND DEVICE FOR FILLING CAVITIES, PARTICULARLY MOLD CAVITIES, WITH A REACTIVE, FLOWABLE MIXTURE

BACKGROUND OF THE INVENTION

The invention relates to a process and a device for filling cavities, and particularly mold cavities, with a reactive, flowable mixture which forms into foam or a solid material, where at least two reaction components are introduced into a mixing zone, where they are mixed and are subsequently introduced into the cavity.

It is the purpose of the invention to fill cavities such as car body parts, with solid materials (and preferably foam materials) and to produce parts in molds by placing a reaction mixture into the mold cavity. Extremely useful molded parts may be produced from polyurethane materials. In general, the reactive components to produce such materials are introduced into the cavity or mold and allowed to react therein. Because increasingly faster reacting mixtures are used in the art in order to decrease the demolding time, and since increasingly larger cavities must be filled to produce larger parts, it is difficult to introduce the entire reaction mixture into the cavity before the reaction starts. The art is aware that the feed of the reaction mixture should utilize a flow front that avoids air enclosure. According to U.S. Pat. No. 3,991,147, it was attempted to obtain such a flow front by following exactly defined conditions. This method will generally fail, however, when large volumes and high reaction speeds no longer allow the observance of those defined conditions.

Another measure used in the art is to provide a sufficiently long gate channel, which calms down the flow. This, however, results in a high material loss. Additionally, the molded part is generally marked by an unsightly gate mark.

Thus, the problem to be solved is to find a process and a device which make it possible to introduce highly reactive mixtures and/or large volumes of mixtures into a cavity, while avoiding the enclosure of air, so that perfect fillings or molded parts are obtained.

DESCRIPTION OF THE INVENTION

Figures 1, 2:
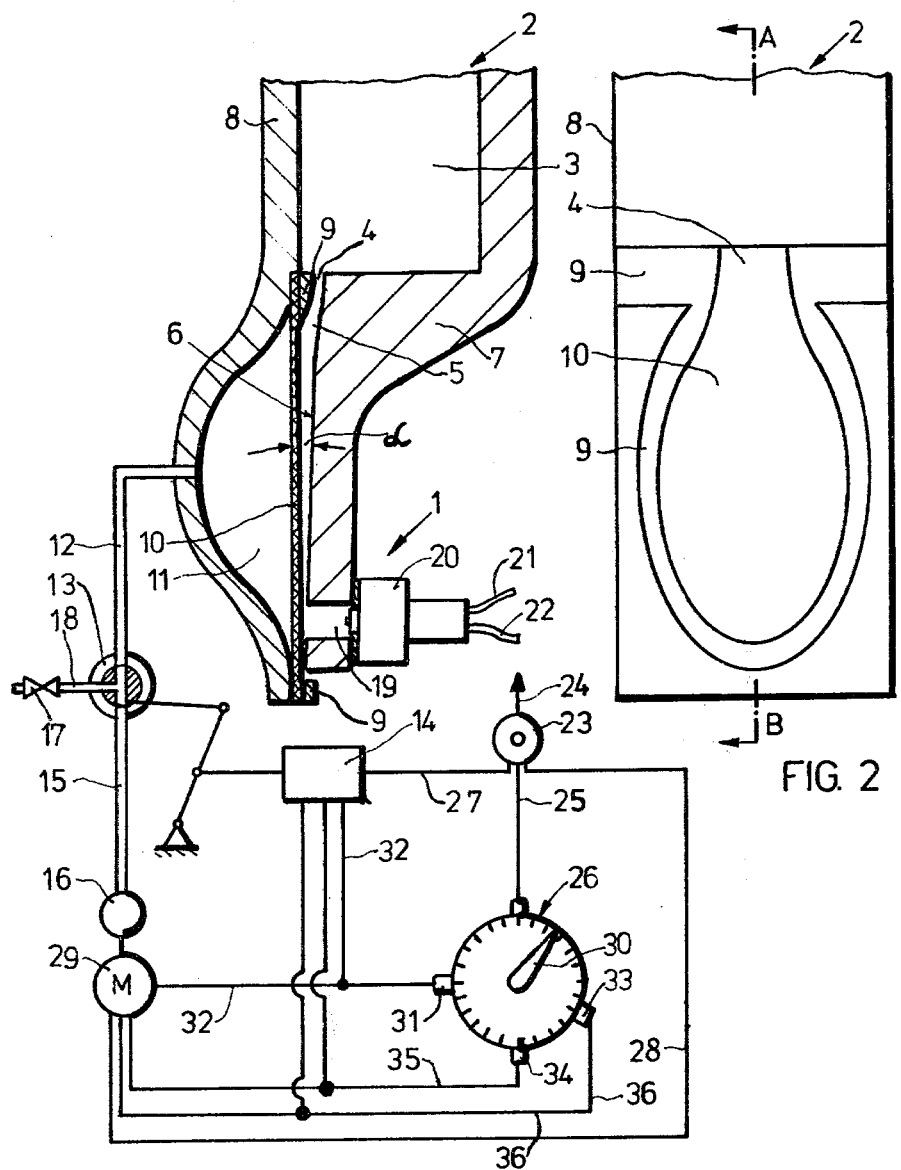
FIG. 1 illustrates a cross-section of a device according to one embodiment taken along line A-B of FIG. 2.
FIG. 2 illustrates a top view of the device of FIG. 1 showing the separating level of the mold part which contains an elastic membrane.

According to the instant invention, the above-noted problem was solved by introducing the reaction mixture into the cavity under a low flow velocity at the start of the filling process within a certain time interval until the mixture has reached a certain level in the cavity and subsequently introducing the remaining portion of the mixture under increased flow velocity. This may be accomplished by changing the transporting capacity of the metering pumps, for example, by increasing the number of rotations of the drives. At the beginning of the filling process, the flow velocity of the reaction mixture entering the cavity is so low that no bottom splashes can occur, which could cause the entrapment of air. The preselected level at which the flow velocity of the mixture flow is increased must be chosen so that the mixture flow does not disrupt the level surface of the material already present in the cavity or mold. By following this measure the inclusion of air is prevented even when increasing the flow velocity. In general, to avoid disrupting the level surface, the feed opening should lie below the level line.

A special version of the process of the invention is characterized in that prior to the start of the mixing process, the volume of a storage area is kept at a minimum. Subsequently, as the reaction mixture flows into the storage area, the volume of the storage area is increased until its maximum volume is reached. Part of the reaction mixture is introduced into the cavity and part is stored in this storage area until a certain level in the cavity is reached by the first portion of the reaction mixture. The portion of the reaction mixture in the storage area is then fed into the cavity with the storage area volume decreased to a minimum toward the end of the filling process. The stored mixture is accordingly pressed into the cavity.

By varying the storage area volume during the entire filling process, the process of the invention can be performed particularly favorably. It is advantageous that the minimum volume of the storage area be zero so that no reaction mixture remains in the storage area after the filling process is completed.

According to a particularly advantageous version of the process of the invention, the reaction mixture is introduced into the cavity at the lowest point. Filling at this point results in a particularly favorable flow, and the danger of air entrapment is significantly reduced.

One device for performing this process consists of a part with a cavity to be filled (particularly a mold). The part is combined with a mixing device. The exit opening of the mixing device corresponds to the feed opening of the part. Component feed lines lead to feed openings to a mixing chamber arranged in the housing of the mixing device. The novelty of the instant invention resides in that the fact that the mixing chamber has a variable volume storage chamber. The walls of the storage chamber, at least partially, consist of an elastic membrane, behind which a cavity is provided, which cavity is connected to a pressure source connected to a relieve valve. This makes it possible to provide a minimum volume in the storage chamber (which is preferably "zero") prior to feeding the components into the mixing chamber. The feed of the components expands the membrane because of its elasticity into the cavity behind it, so that the reaction mixture is stored in the expanding storage chamber at the beginning of the mixing process (at the same time a portion of the reaction mixture is introduced into the cavity). Pressure, e.g. air or hydraulic fluid, is applied to the cavity behind the membrane toward the end of the filling process and the storage chamber volume can accordingly be reduced. The elasticity of the membranes, the contour and size of the cavity, the control of the feed quantity of the components per time interval, and the volume increase or decrease of the storage chamber can be designed for optimum operating conditions. It is advantageous if the storage chamber in which the elastic membrane is arranged is capable of being separated since the elastic membrane can then be easily cleaned if any reaction mixture remains.

According to one special version of the device, the membrane in its minimum volume position and the opposing wall form an angle α which opens toward the cavity of the part to be filled. When emptying the storage chamber toward the end of the filling process, the membrane is accordingly first pressed against the end of the storage chamber furthest away from the cavity toward the opposite wall. This pressing process will then slowly continue toward the exit opening. This allows for a particularly thorough emptying of the storage chamber.

The membrane is preferably mounted to the housing with a frame. This makes it possible to quickly exchange the membrane if need be, in case it is torn or if another membrane with a different elasticity is to be used to obtain particular properties.

According to yet another embodiment of the invention, the frame is designed as a seal. In order to avoid material losses and to avoid disrupting of the filling and mixing processes, it is extremely important that the storage chamber be sealed toward the outside.

Preferably, the device is combined with a program control instrument for the delivery and removal of the pressure agent into the cavity behind the membrane. This permits the adjustment of the operating conditions to the particular requirements by applying counter pressure or sub-pressure and optionally by variation of this pressure over the duration of the filling process.

In another embodiment of the invention, the mixing chamber has a storage chamber, the volume of which can be changed (or adjusted) toward its exit direction with a piston which can be adjusted, where the adjustable maximum volume of the storage chamber is a multiple of the minimum volume. In this version of the invention, the discharge piston can be retracted to increase the storage chamber volume. (In the known mix heads with discharge pistons, the piston only opens the injection openings and the mixing chamber extends all the way to the cavity.) Even in this version of the invention, the variation of the storage chamber volume can be favorably influenced by a program selection, by which the piston can be guided hydraulically or pneumatically. Furthermore, it is also of advantage to utilize a storage chamber which can be opened for cleaning if necessary. Preferably, the storage chamber simultaneously serves as the mixing chamber. This results in design simplification and the avoidance of reaction mixture remaining during operation.

Reference will now be made to the drawings to further explain the instant invention.

In FIGS. 1 and 2, the mix head 1 is connected to the mold 2. The mold 2 (i.e., the part to be filled) has a cavity 3. Upstream of the cavity is a feed opening 4, which simultaneously represents the exit opening of a storage chamber 5. The storage chamber 5 is limited by the wall 6 of the mold 7 and by the elastic membrane 10. Frame 9 serves as a seal and is bolted to the mold 8. The membrane itself may consist of a wear-resistant polyurethane elastomer which is coated with an anti-adhesive agent on the side toward the storage chamber 5. A hollow cavity 11 is located behind the membrane 10, which, as shown in the drawings, may have contour of half of an elliptic part split lengthwise. A pneumatic line 12 leads to this cavity 11, which line can be connected through the line 15 with a compressor 16 and can be connected with a venting nozzle 18 having an adjustable throttle valve 17. The connections are made by a three-way valve 13, which can be regulated by a servomotor 14. A mixing chamber 19 with a double injection nozzle 20 for both reaction components is arranged in the mold, whose connections 21, 22 lead through metering pumps to storage containers (not shown). A starter button 23 to initiate the mixing and filling processes is connected by the impulse line 24 to the drive (not shown) of the metering pumps. The starter button is also connected to a further impulse line 25 which leads to an adjustable timer 26, an impulse line 27 to the servomotor 14 and an impulse line 28 to the drive 29 of the compressor 16. The timer 26 has a hand 30 and is provided with an adjustable limit switch 31, where the time can be selected during which the emptying of the storage chamber 5 is to take place. From this limit switch 31 leads a branching impulse line 32 to the servomotor 14 and to the drive 29 of the compressor 16. The timer 26 is provided with further limit switches 33, 34 which can also be connected over branched impulse lines 35, 36 to the servomotor 14 and the drive 29.

The device according to embodiment of FIGS. 1 and 2 functions as follows: When pressing the start button 23, the metering pumps (not shown) are activated and isocyanate and polyol with an added activator can be transported from the storage containers to the mix head 1, where they are brought into the storage chamber 5 by the double injection nozzle 20. At the same time, the timer 26 is activated by the impulse line 25. Its limit switch 31 is set to such a time span that it can be activated at the time the storage chamber 5 is to be emptied. Furthermore, the servomotor 14 is activated through the impulse line 27 so that the three-way valve 13 connects the cavity 11 with the exit nozzle 18. The membrane 10 accordingly can give toward the pressure building up in the storage chamber 5 caused by the component flow, until it presses against the opposite wall of the cavity 11. While the compliance of the membrane 10 depends mainly on its elasticity, it can additionally be regulated by the adjustable throttle valve 17, whose effect can influence the pressure in the storage chamber 5. The introduction of the reaction mixture can then be metered quite correctly. Thus, a portion of the reaction mixture can be stored during the increase phase of the storage chamber volume, so that only a smaller amount flows into the mold cavity 3 at a relatively low velocity. If necessary, the pressure in the cavity 11 can additionally be regulated by the further adjustable limit switches 33, 34 where, e.g. even by activating the compressor 16, a counter pressure in the cavity 11 can be created. In such a case, limit switch 33 and impulse line 36 will give the servomotor 14 the order to connect the simultaneously activated compressor 16 over the three-way valve 13 with the cavity 11. When the limit switch 34 is reached, the commands are being retracted over the impulse line 35. The ratio of the amount of reaction mixture to be stored per time interval and to be brought into the cavity 3 is selected so that the flow speed in the feed opening 4 is so low that a closed flow front is formed, that is, air entrapment is avoided. With the rising level in the mold cavity 3, the flow speed can continuously be increased as long as the flow does not disrupt the level. It is also possible—and this is less expensive regarding regulating equipment, but more time-consuming—to maintain the low flow speed until the maximum storage volume is reached. Then the flow, since no further storage possibility exists, will increase by itself to the maximum flow speed. The storage volume is therefore dependent on the level in the mold cavity 3 where the flow no longer disrupts the level at maximum speed. These values can easily be empirically determined. When the hand 30 of the timer 36 has reached the limit switch 31, that is, the mixing time is finished, the servomotor 14 receives the order through impulse line 32 to connect the compressor 16 with the cavity 11. The drive 29 receives the order through the same impulse line to activate the compressor 16. Through line 12 pressure air flows into the cavity 11 and presses against the membrane 10, which again reduces the volume of the storage chamber 5. The storage chamber is accordingly emptied.

During the emptying process, the membrane 10 presses at first to the wall 6 at the end furthest away from the feed opening 4. This is due to the fact that at its minimum volume, the membrane and the opposing wall form an angle α, preferably of 3°. This guarantees the complete evacuation of the storage chamber 5. The evacuation interval is completed when the hand 30 of the timer 26 has reached its initial position.

Figure 3:
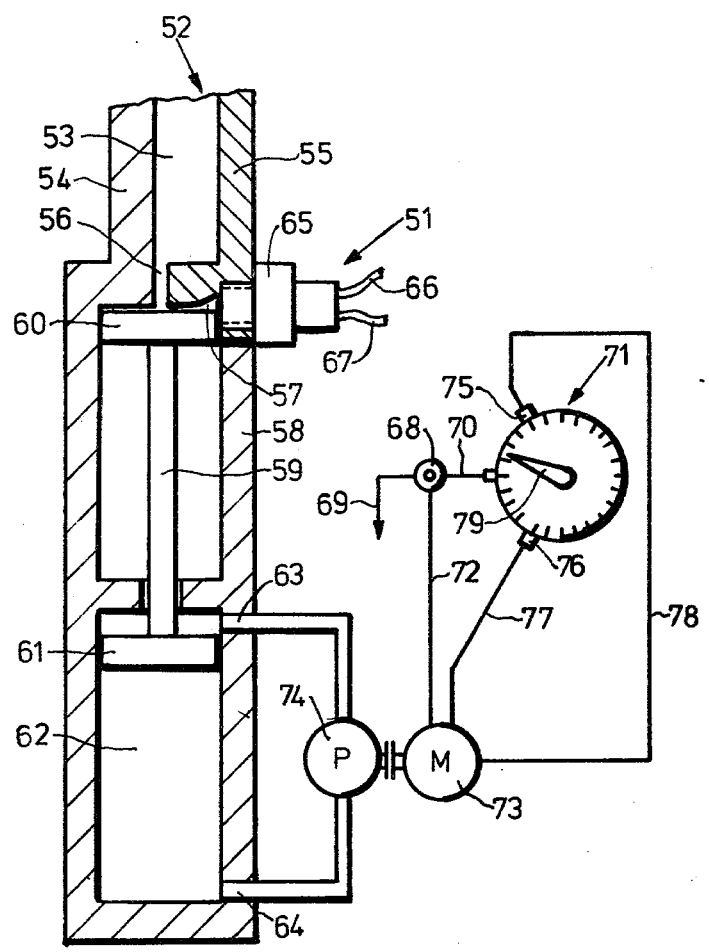
FIG. 3 illustrates a second embodiment in a cross-section where the storage container simultaneously represents the mixing chamber.

In FIG. 3, the device also consists of the combination of a mix head 51 with a mold 52. The mold 52, that is the part to be filled, has a cavity 53 which is formed by the mold parts 54 and 55. A feed opening 56 is provided in front of the cavity 53, which simultaneously serves as exit opening of the reaction mixture and storage chamber 57. The mix and storage chamber 57 consists of a cylindrical cavity limited by the housing 58. A piston 60 connected to a piston rod 59 is guided within the cavity. On the other end of the piston rod 59 is a hydraulic piston valve 61 in a hydraulic chamber 62 arranged in the housing 58, which is provided with connections 63 and 64. The mix head 51 is furthermore provided with a two-component injection nozzle 65, which is connected with connections 66 and 67 over metering pumps to storage containers (not shown). A start button 68 to initiate the mixing and filling process is connected over an impulse line 69 with the drive of the metering pumps, is connected over an impulse line 70 which leads to an adjustable timer 71, and is connected over another impulse line 72 which leads to the drive 73 of a reversible-feed hydraulic pump 74, arranged between the connections 63 and 64. The timer 71 is provided with adjustable limit switches 75 and 76. The limit switch 75 is set to the time interval corresponding to the time required by the piston 60 to enlarge the mix and storage chamber 57 from its minimum volume to its maximum volume. The position of the second limit switch 76 is dependent on time interval for the duration of the mixing process. The remaining time intervals depends on the time required for evacuating the mix and storage chamber 57. The limit switches 75, 76 are connected over impulse lines 77,78 to the drive 73 of the hydraulic pump 74. The hand of the timer 71 is marked 79.

The device according to embodiment in FIG. 3 functions as follows: By pressing the start button 68, the metering pumps (not shown) are activated and isocyanate and polyol with an added activator are transported from the storage containers to the mix head 51, where they are brought into the mix and storage chamber 57 through the double injection nozzle 65. By pressing the start button 68 the timer 71 is simultaneously activated over the impulse line 70. Also at the same time an impulse given by line 72 reaches the drive 73, which makes the hydraulic pump 74 feed to the connection 63. This pushes the piston 60 from the minimum position of the mix and storage chamber volume into the maximum position, so that a considerable portion of the mixture is stored in the mix and storage chamber 57. When the mix and storage chamber 57 has reached its maximum volume, that is when the hand 79 of the timer 71 has activated the limit switch, the drive 73 receives the order over impulse line 77 to stop the hydraulic pump 74. The normal mold filling process now occurs at maximum flow velocity of the reaction mixture into the mold cavity 53 until the mixing process is completed by reaching the required mixture quantity for the article to be foamed. At this time the hand 79 of the timer 71 activates the end contact 76, and the drive 73 receives the signal to start. The feed direction of the hydraulic pump 74 reverses, so that it feeds into the connection 64. The mix and storage chamber 57 is again reduced to its minimum volume by the piston 60 and the present mixture is pushed into the cavity 53. Now the hand 79 of the timer 71 has again reached its initial position.

It is understood that the embodiments about the program control of the devices according to FIGS. 1 and 2, and 3 are drastically simplified for reasons of clarity.

What is claimed is:

1. In a process for filling a mold with a reactive, flowable mixture which preferably forms foam, wherein at least two reaction components are brought into a mixing means, where said components are mixed and subsequently brought into a cavity of a mold, the improvement wherein, at the beginning of the filling process, a first portion of the reaction mixture is fed into the cavity of said mold under low flow velocity until the mixture has reached a preselected level in the cavity of said mold, less than full, and subsequently the remaining portion of the mixture to be injected is fed in under increased flow velocity.

2. The process of claim 1, wherein said remaining portion is stored in a variable volume storage means until said preselected level in the cavity of said mold is reached by said first portion of the reaction mixture, and wherein said remaining portion is injected into the cavity of said mold once said preselected level is reached and that towards the end of the filling process the volume of said storage means is decreased to a minimum and the stored mixture is pushed into the cavity of said mold.

3. The process of claim 2, wherein said storage means is simultaneously used as a mixing means.

4. The process of claim 2, wherein the minimum volume of said storage means is zero.

5. The process of claim 1, wherein the reaction mixture is injected into the cavity of said mold at its lowest point.

6. The process of claim 2, wherein said storage means is kept under pressure.

7. The process of claim 2, wherein the volume change of said storage means is caused by an expandable wall of said storage means.

8. The process of claim 7, wherein said expandable wall is an elastic membrane.

9. In an apparatus for introducing reactive components into a cavity comprising an interconnecting mold and mixing means, the exit opening of said mixing means corresponding to the feed opening of said mold and component feed lines leading to said mixing means, the improvement wherein said mixing means is connected to a storage means, whose walls at least partially consist of an elastic membrane, behind which an elastic membrane cavity is arranged, said membrane being connected with a pressure source and a venting nozzle.

10. The apparatus of claim 9, wherein said elastic membrane cavity is separated from the reactive components by said elastic membrane.

11. The apparatus of claim 9, wherein said elastic membrane and the opposite wall form an angle which opens toward the cavity of said mold to be filled.

12. The apparatus of claim 9, wherein said membrane is attached to a housing by a frame.

13. The apparatus of claim 12, wherein said frame is designed as a seal to prevent reaction mixture from entering the cavity behind said elastic membrane.

14. In an apparatus for introducing reactive components into a cavity comprising an interconnecting mold and a mixing means, the exit opening of said mixing means corresponding to the feed opening of said mold, and component feed lines leading to said mixing means, the improvement wherein said mixing means is immediately connected with a storage means whose volume can be changed opposite its exit direction by a movable piston, wherein the maximum volume of the storage chamber is a multiple of the minimum volume.

15. The apparatus of claim 14, wherein said storage chamber contains said mixing means.

* * * * *